Aug. 16, 1927.
K. BAUMANN
1,639,480
FLEXIBLE COUPLING FOR SHAFTS
Filed March 4, 1922
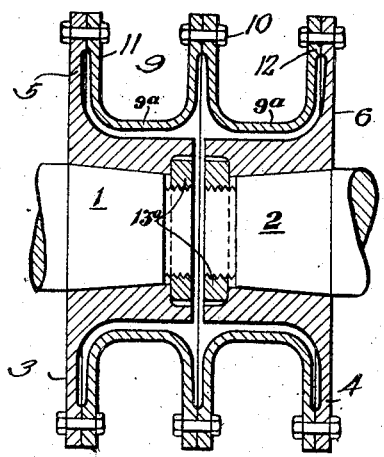
Fig. 4.
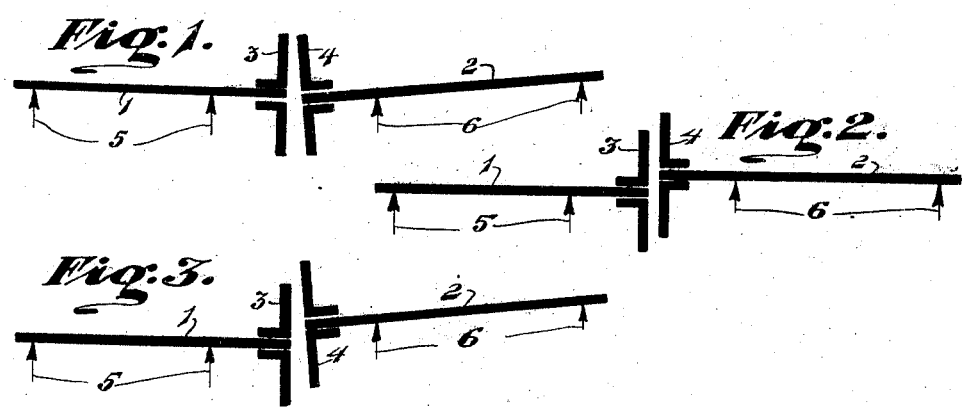
Karl Baumann
INVENTOR
BY D. C. Davis
ATTORNEY
WITNESSES:

Patented Aug. 16, 1927.

1,639,480

UNITED STATES PATENT OFFICE.

KARL BAUMANN, OF URMSTON, ENGLAND, ASSIGNOR TO WESTINGHOUSE ELECTRIC AND MANUFACTURING COMPANY, A CORPORATION OF PENNSYLVANIA.

FLEXIBLE COUPLING FOR SHAFTS.

Application filed March 4, 1922, Serial No. 540,964, and in Great Britain March 24, 1921.

This invention relates to flexible couplings for shafts and has for its object to provide an improved construction which while possessing a certain amount of flexibility, as hereinafter described, shall be capable of transmitting comparatively large amounts of power.

A coupling may possess flexibility of various kinds. Tranverse flexibility of the coupling permits the two coupled shafts to be out of alignment by reason of the axis of one shaft making an angle with the axis of the other shaft. Eccentric flexibility permits the two shafts to be out of alignment with their axes still remaining parallel. In some cases the axes of the shafts are located at an angle with each other and their point of intersection does not fall in the central plane of the coupling, and in this case the coupling should possess both transverse and eccentric flexibility.

According to the present invention the improved couplings, which are both transversely and eccentrically flexible, comprise two resilient diaphragms respectively secured by their edges or rims to the shafts to be coupled and united by a hollow or solid distance-piece.

To enable the invention to be clearly understood it will now be described with reference to the accompanying drawings in which Figs. 1, 2 and 3 are diagrams representing shafts which are to be coupled together and illustrating respectively three types of irregularity for which the coupling according to the invention is designed to compensate, whilst Fig. 4 is a sectional view of a coupling embodying the features of my invention.

In Figs. 1 to 3 the shaft 1 and the shaft 2 to be coupled by means of coupling members 3 and 4 are supported in bearings 5 and 6. The shafts may be at an angle with one another with their axes intersecting between the coupling members 3 and 4 as shown in Fig. 1. Instead of the irregularity illustrated in Fig. 1 the shafts 1 and 2 may be eccentric and yet parallel with one another as shown in Fig. 2. Or as shown in Fig. 3 the shafts may be inclined to one another so that their axes do not intersect between the coupling members 3 and 4. In Fig. 4 of the drawings, the shaft sections 1 and 2 are provided with coupling heads 3 and 4, the latter being secured to the shaft sections in any suitable manner, as for example, by means of the nuts $13^a$. The coupling heads are preferably provided with flange portions 5 and 6.

A resilient distance piece 9 is formed of substantially annular U-shaped members $9^a$, the adjacent radial portions of the latter being secured together in any suitable manner, as by means of bolts at 10. The outermost radial portions 11 and 12 of these members $9^a$ are then secured in a similar manner to the flanges 5 and 6 of the coupling heads 3 and 4 respectively.

The radial portions of the pieces $9^a$ are preferably of flexible material, while the flanges 5 and 6 of the coupling heads 3 and 4 are rigid with the heads. In this way a flexible coupling is provided which has relatively great strength in proportion to its weight and which is easily connected and disconnected.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

I claim:

1. In a flexible coupling for shafts, the combination of a coupling head secured to each shaft, each coupling head having a rigid and a laterally extending flange portion, a plurality of torque transmitting members for connecting the coupling heads together, each of said torque transmitting members having unitary formed and laterally extending flexible end portions, means for connecting the flexible end portions of adjacent torque transmitting members together, and means for connecting the remaining end portions of the torque transmitting members to the flange portions of the respective coupling heads.

2. In a flexible coupling for shafts, the combination of a coupling head secured to each shaft, each coupling head having a laterally extending and rigid flange portion remotely disposed from the shaft end, a plurality of torque transmitting members surrounding the coupling heads for connecting the coupling heads together, each of said torque transmitting members having unitary formed, laterally extending, flexible end portions, means for connecting the peripheries of the end portions of adjacent torque transmitting members together, and means for connecting the peripheries of the remaining end portions of the torque transmitting members to the flange portions of the respective coupling heads.

3. In a flexible coupling for shafts, the combination of a coupling head secured to each shaft, each of said coupling heads having a laterally extending and rigid flange portion remotely disposed from the shaft end, a plurality of cylindrical torque transmitting members for connecting the coupling heads together, each of said torque transmitting members having unitary formed, radially extending, flexible end portions, means for connecting two of the end portions to the flange portions of the respective coupling heads, and means for connecting the remaining end portions to each other.

In testimony whereof, I have hereunto subscribed my name this third day of February, 1922.

KARL BAUMANN.